(12) United States Patent
Schaefer et al.

(10) Patent No.: US 8,283,597 B2
(45) Date of Patent: Oct. 9, 2012

(54) SWITCHING MODULE FOR THE POWER SECTION OF A WELDING CONTROL SYSTEM

(75) Inventors: Guenter Schaefer, Wald-Michelbach (DE); Reinhard Scholz, Erbach (DE)

(73) Assignee: Robert Bosch GmbH, Stuttgart (DE)

( * ) Notice: Subject to any disclaimer, the term of this patent is extended or adjusted under 35 U.S.C. 154(b) by 330 days.

(21) Appl. No.: 12/682,430

(22) PCT Filed: Aug. 22, 2008

(86) PCT No.: PCT/EP2008/006904
§ 371 (c)(1),
(2), (4) Date: May 11, 2010

(87) PCT Pub. No.: WO2009/049709
PCT Pub. Date: Apr. 23, 2009

(65) Prior Publication Data
US 2010/0219700 A1    Sep. 2, 2010

(30) Foreign Application Priority Data

Oct. 11, 2007 (DE) .......................... 10 2007 048 847

(51) Int. Cl.
*B23K 9/10* (2006.01)
(52) U.S. Cl. ................. 219/130.1; 219/136; 219/137.62
(58) Field of Classification Search ............... 219/130.1, 219/136, 137.62, 61.7, 91.21
See application file for complete search history.

(56) References Cited

U.S. PATENT DOCUMENTS 7,326,879 B2 * 2/2008 Andersen et al. .......... 219/130.1
2006/0044762 A1   3/2006 Kikuchi et al.

FOREIGN PATENT DOCUMENTS

| DE | 10245288 A1 | 4/2004 |
|---|---|---|
| EP | 0667641 A1 | 8/1995 |
| FR | 2123067 A | 9/1972 |

* cited by examiner

*Primary Examiner* — David Lam
(74) *Attorney, Agent, or Firm* — Maginot, Moore & Beck

(57) ABSTRACT

The invention provides a compact and economical welding control system having an integrated power section. To this end, a switching module is provided for the power section of a welding control system. The switching module has a switching device, at least one cooling body, a current supply and an insulating element which provides a potential-free coolant arrangement. The invention is advantageous in that the potential-free coolant arrangement allows the coolant bodies to be shortened so that less space is required inside the control system and the control system can therefore have a more compact structure. The invention enables even the requirements in terms of the coolant bodies to be reduced, allowing the use of cost-effective cooling tubes or even cooling pipes that are directly connected to the cooling body.

20 Claims, 2 Drawing Sheets

SWITCHING MODULE FOR THE POWER SECTION OF A WELDING CONTROL SYSTEM

CROSS-REFERENCE TO RELATED APPLICATION

This application is a 35 USC 371 application of PCT/EP2008/006904 filed on Aug. 22, 2008.

BACKGROUND OF THE INVENTION

1. Field of the Invention

The invention relates to a switching module for the power section of a welding control system, and to a method for producing such a module.

In the course of development of welding control systems, increasingly high packing densities of the power electronics components are demanded, so as to keep the structural size of the tool or the like as small as possible. These higher and higher packing densities require active dissipation of lost power. For that purpose, the components are typically screwed in heat-locking fashion onto extruded hollow profile sections, through which a fluid passes, such as coolant carried in a coolant loop. Aluminum is especially suitable for the extruded hollow profile sections because of its properties, in particular its very good thermal conduction and its very good processability by means of extrusion.

2. Description of the Prior Art

German published patent disclosure DE 102 45 288 A1 shows the power section for an inverter and a method for producing the power section. FIG. 1 of the disclosure shows a schematic view of a section through the power section of the inverter. An IGBT module is mounted on a cooling body, and disk cell diodes are attached to the same cooling body. The collector of the IGBT shown is connected to the cathode of the disk cell diodes via a large-area, low-impedance copper rail. The emitter of the IGBT is connected to the anode of the disk cell diode via a further large-area, low-impedance copper rail. In the vicinity of the IGBT module, the two copper rails are separated electrically insulated from one another by means of an insulation layer. As one clearly sees in FIG. 1 of this aforementioned disclosure, the current-carrying rail is disposed directly on the cooling body. FIG. 1 shows only one-sided cooling of the disk cell diode. It is also pointed out in the disclosure that an additional cooling body can be disposed from above, to improve the utilization of the diode. Accordingly, the current supply rails would be disposed between two cooling bodies.

Similar devices are also known in conjunction with the power section of alternating current welding control systems. As a rule, two thyristor disk cells are disposed between two aluminum cooling bodies, and the current supply is again effected to the thyristor disk cells via the conductive aluminum cooling bodies. As a consequence, the cooling bodies are simultaneously used for conducting current, and thus the potential of the current supply rails is applied to these cooling bodies. Typically, the cooling bodies are connected by means of coolant hoses, so that it is possible to exchange the coolant between the cooling bodies. For that purpose, the coolant must flow into a first cooling body by means of a first coolant supply and must flow onward by means of the connection from the first to the second cooling body. The coolant flows out again at an outlet opening in the second cooling body. The connection between the cooling bodies and the inflow to and outflow from the cooling body takes place in the prior art by means of special hoses. Very high demands in terms of dielectric strength are made of these hoses, because they have to establish a connection between the first and second cooling bodies, and the cooling bodies are at different potentials. Furthermore, these hoses are also secured to the housing of the welding control system and are thus automatically connected to ground potential, since this housing is itself grounded. For connecting the hoses to a pump system, there are additional hose connections on the housing.

The disadvantage of this arrangement is that because of the potential difference that prevails between the cooling bodies as well as between the cooling bodies and the hose connections on the housing, the hoses must in principle have a certain length, so that the dielectric strength between the potentials at the power section and the ground potential is always ensured.

OBJECT AND SUMMARY OF THE INVENTION

The object of the invention is to find a solution to these problems that to the greatest possible extent overcomes these disadvantages.

The invention attains this object by making a switching module for the power section of a welding control system available, which switching module includes switching devices, cooling bodies of electrically conductive material, and a current supply, and the current supply means contacts the switching means devices and the cooling bodies for cooling the switching devices contacts the current supply, and an insulation is disposed between the cooling bodies and the current supply in such a manner that the cooling bodies is free from the electrical potential of the current supply as the device is put into operation.

The advantage is that substantially shorter connections between the first and second cooling body can be used. In principle, a short, U-shaped hose or U-shaped piece or pipe that connects the outlet of the first cooling body to the inlet of the second cooling body suffices. The simplest possible small copper or aluminum tubes can be used as the connecting piece coolant supply, since the cooling bodies have the same potential.

The hose lengths known in the prior art between the cooling bodies, that is, between the cooling bodies inlet and the cooling bodies outlet, and the hose connection at the housing can be dimensioned independently of the potential. The structural size of the welding control system is reduced, as are the production costs. The costs both for installing the hoses and for their procurement itself are less.

Another advantage of this provision according to the invention is that now the current supply contacts the switching devices directly; that is, the current supply is no longer connected to the switching devices indirectly via the cooling bodies, and as a result, the current supply additionally serves the purpose of heat dissipation. Since the current supply is embodied in rail-like fashion, the switching devices, which as a rule are cell-like, rest with their full area or a large area on these rails, making an optimal heat transfer attainable.

Preferably, a second switching device, a second cooling body, and a second current supply are provided, and a first connection of the switching device contacts the first current supply, and a second connection of the switching device contacts the second current supply, and the switching means device between the two current supplies are connected antiparallel, and the switching device and current supply are disposed between the first and second cooling bodies, and a second insulation is also disposed between the second current supply and the second cooling body.

As a result, a very compact construction is obtained, by which the switching devices, which as a rule switch very strong currents (kA), for instance for welding purposes, are effectively both cooled and supplied with current from both sides.

Because of this compact mode of construction, the switching module of the invention can be accommodated easily and in a space-saving way in the housing of a welding control system.

Especially preferably, the insulation is attained by means of an electrically insulating and thermally conductive foil or plate. This preferably involves thermoplastic, or insulation made from synthetic polymers. Such foils or plates can be procured inexpensively, and in the production of the switching modules, they can be placed without great effort and simply between the current supply and the cooling bodies so that they insulate the two over their full area from one another.

The insulation is preferably additionally strengthened by a reinforcing element, such as a woven glass fiber fabric that has been incorporated into the foil or plate. This prevents compressive or shear forces, which might arise during the installation of the switching module, from damaging the foil.

Preferably, the switching device, the cooling bodies, the current supply, and the insulation means are fastened between two clamping bodies. The clamping bodies may for instance be realized by means of two tension springs, and the tension springs contact the cooling bodies on both sides and are pressed against the cooling bodies by means of a threaded rod and nuts screwed onto both ends of the threaded rod. These external forces, which act on the cooling bodies by means of the nuts and the tension springs, have the effect that all the components, including the insulation, are pressed firmly against one another, resulting in a compact and stable construction.

Especially preferably, the switching module includes a connecting element, which can be disposed between the two cooling bodies and makes it possible to exchange fluid between the two cooling bodies. The fluid can be delivered to the first cooling bodies by means of an inlet and can flow from the first cooling body to the second by means of the connecting element, and by means of an outlet at the second cooling body, the fluid can flow out of the second cooling body again. Thus a circulation of coolant can be attained that ensures maximum heat dissipation directly at the heat source.

Especially preferably, the cooling body is a hollow profile section, for instance of aluminum.

The switching devices installed in the switching module are preferably power semiconductors, in particular thyristor cells in the form of disk cells, which can be procured inexpensively as a mass-produced product.

If a welding control system is equipped with a power section integrated with the welding control system housing, and the power section includes a switching module of the invention, then this controller can be embodied very compactly and inexpensively, since fewer supply lines are needed for cooling the switching module, because of the attachment of the insulation in a manner according to the invention.

In the production of the switching module of the invention for power sections of a welding device, the procedure as a rule is first for the current supply, such as current-carrying rails, to be disposed on the switching devices, such as thyristor cells. Next, the insulation, such as an insulating foil, is placed on the current-carrying rails, and then the cooling bodies are placed with their full area against the insulation and fixed by means of the aforementioned tension springs. The advantage that has been attained from this arrangement has already been described above.

Further advantageous embodiments, characteristics, and details of the invention will become apparent from the dependent claims, the description of the exemplary embodiment, and the drawings.

BRIEF DESCRIPTION OF THE DRAWINGS

The invention will be described in further detail below in terms of exemplary embodiments in conjunction with the drawings, in which.

DESCRIPTION OF THE PREFERRED EMBODIMENT

Figure 1:
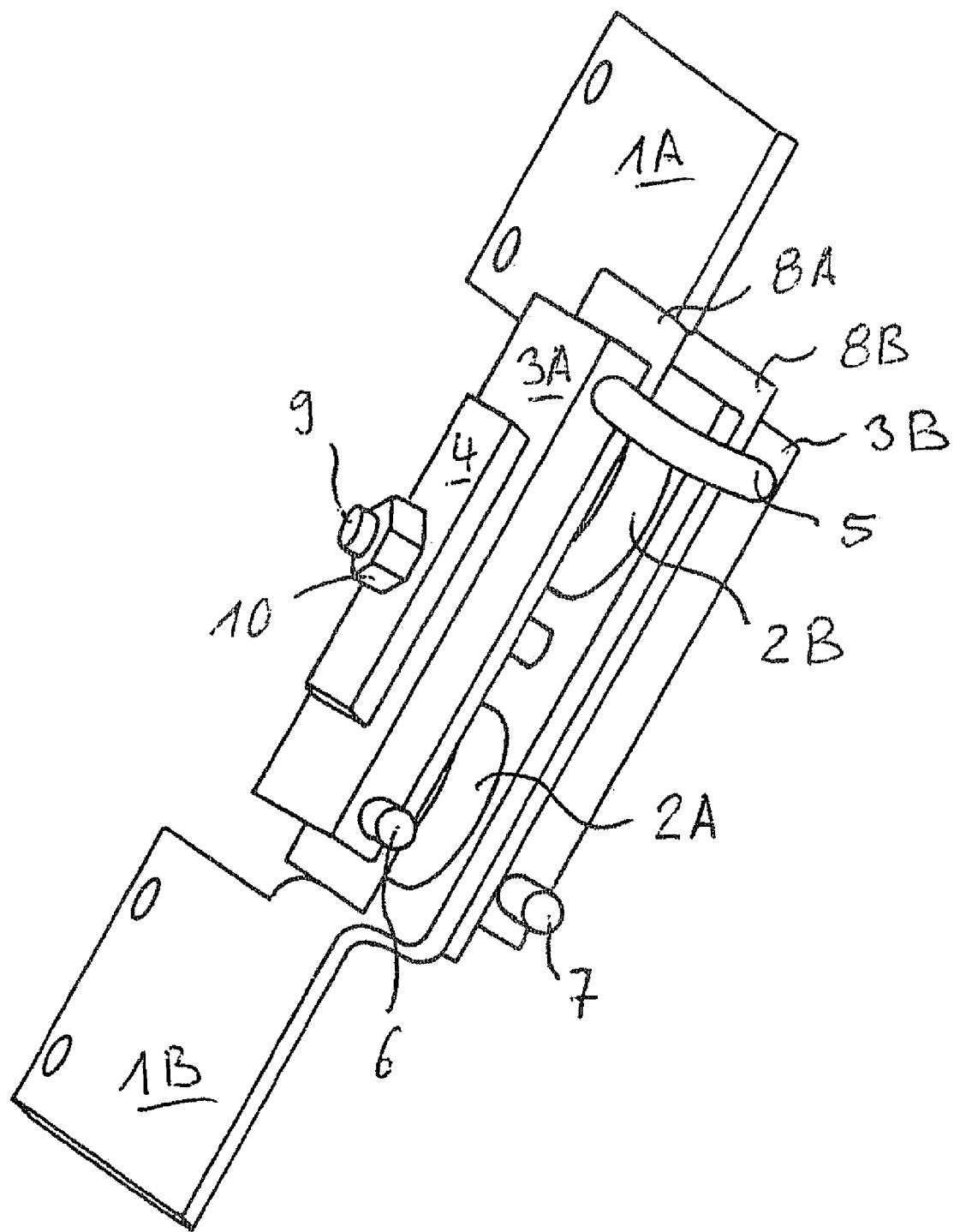
FIG. 1 is a perspective view of the switching module of the invention.

FIG. 1 shows a perspective view of the switching module, with two thyristor cells 2A and 2B, two cooling bodies 3A and 3B, two current supply means or current-carrying rails 1A and 1B, two insulation means in the form of insulating, reinforced foils (glass-fiber-reinforced silicone foil or foils 8A, 8B having the trademark "Kapton"), and a tension spring 4 (the second tension spring is not shown), and a threaded rod 9 with a nut 10 (the second nut is not shown). The thyristor cells 2A, 2B are disposed centrally and are placed between the current-carrying rails 1A, 1B in such a way that by means of their terminals they rest with their full area on the rails 1A, 1B. On either side of the rails 1A, 1B is a respective glass-fiber-reinforced silicone foil 8A, 8B, disposed such that the cooling bodies 3A and 3B rests with a full area on this foil and is electrically insulated from the respective rail 1A and 1B. Extending through the entire arrangement is a bore or tubular conduit that can receive the threaded rod 9, so that the entire arrangement is clamped in such a way between tension springs 4, disposed on both sides, by means of nuts 10 screwed onto the threaded rod 9 on both ends, that not only the electrical connection between the thyristor cells 2A and 2B and the current-carrying rails 1A and 1B but also the dissipation of heat can be accomplished in the best possible way by means of the cooling bodies 3A and 3B.

A hose that delivers a coolant carried by a pump into the cooling body 3A can be connected to the inlet 6 of the first cooling body 3A. By means of the connection 5 between the first cooling body 3A and the second cooling body 3B, the coolant can flow out of the cooling body 3A to the cooling body 3B and be carried back into the pump circulation by means of the outlet 7 from the second cooling body.

Figure 2:
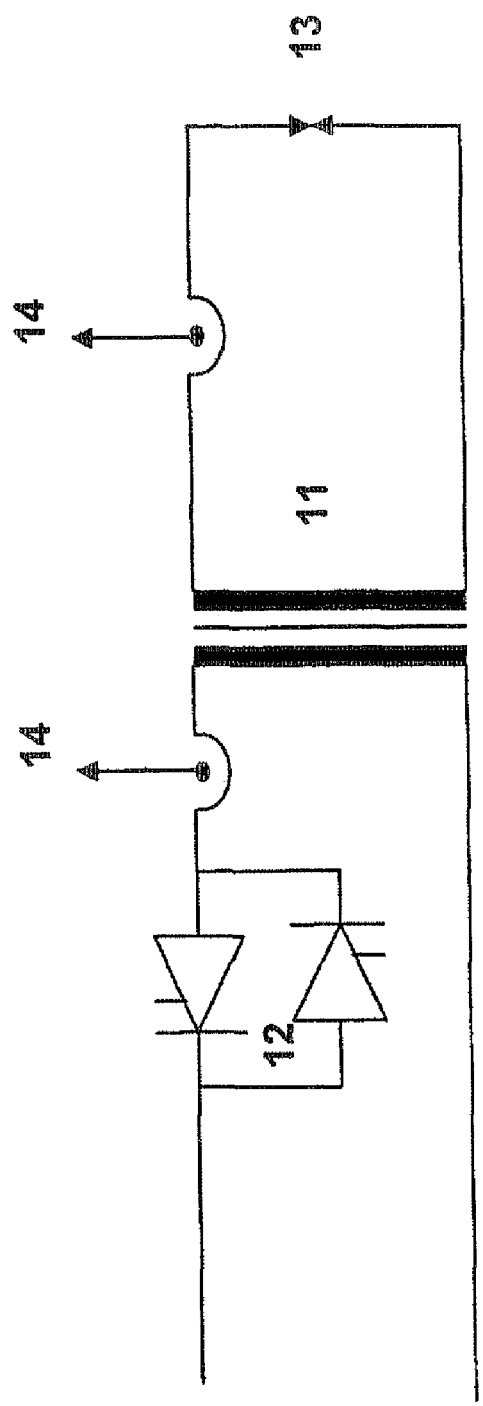
FIG. 2 schematically shows the incorporation in terms of circuitry of the switching module of the invention into an AC resistance welding system.

FIG. 2 shows the basic circuit diagram of an AC resistance welding device in fragmentary form; that is, in particular, it shows the welding transformer 11, which can be controlled on a primary side (left side as viewed in FIG. 2) by means of the switching module 12 of the invention, so that by a welding arrangement, such as by welding tongs 13 of a resistance welding system, disposed on the secondary side (right side as viewed in FIG. 2) can be subjected to welding current. Two current measurement points 14 are additionally shown, which can detect the change in the welding current on the primary and secondary sides and forward it to a welding control system from the measurement points 14.

For controlling the welding current in the "current control" mode of operation, the thyristors 2A, 2B of the welding device of the invention are ignited at a fixedly predeterminable phase angle value. In the "current regulation" mode of operation, the current that has occurred in the past is additionally used by the welding control system to calculate the new phase angle value.

The foregoing relates to the preferred exemplary embodiment of the invention, it being understood that other variants and embodiments thereof are possible within the spirit and scope of the invention, the latter being defined by the appended claims.

The invention claimed is:

1. A switching module for the power section of a welding control system, having switching means, cooling means of electrically conductive material, and current supply means, in which the current supply means contacts the switching means, and the cooling means for cooling the switching means contacts the current supply means, wherein between the cooling means and the current supply means, an insulation means is disposed in such a manner that the cooling means is electrically insulated from the current supply means.

2. The switching module as defined by claim 1, wherein a second switching means, a second cooling means, a second current supply means, and a second insulation means are provided, and a first terminal of the switching means contacts the second current supply means, and a second terminal of the switching means contacts the second current supply means, so that both switching means are connected antiparallel, and the switching means are disposed between the two current supply means, and an insulation means also contacts the second current supply means, and the cooling means is disposed on that insulation means.

3. The switching module as defined by claim 2, wherein the insulation means is embodied by a foil or a plate with electrically insulating and thermally conducting properties, preferably of thermoplastic or of synthetic polymers.

4. The switching module as defined by claim 3, wherein the insulation means includes a reinforcement means.

5. The switching module as defined by claim 2, wherein the insulation means includes a reinforcement means.

6. The switching module as defined by claim 2, wherein the switching means, cooling means, current supply means, and insulation means are disposed between two clamping means.

7. The switching module as defined by claim 2, wherein the first cooling means and second cooling means are connected by means of a connecting means to one another for exchanging coolant, and the first cooling means includes a fluid inlet, and the second cooling means includes a fluid outlet.

8. A welding control system, having a power section integrated with the welding control system housing, wherein the power section includes a switching module as defined by claim 2.

9. A welding device having a welding control system as defined by claim 8, wherein the first and second current supply means of the power section are disposed between a welding control part and a primary part of a welding transformer, such that a welding current is controllable or regulatable by means of the switching module.

10. The switching module as defined by claim 1, wherein the insulation means is embodied by a foil or a plate with electrically insulating and thermally conducting properties, preferably of thermoplastic or of synthetic polymers.

11. The switching module as defined by claim 10, wherein the insulation means includes a reinforcement means.

12. The switching module as defined by claim 10, wherein the switching means, cooling means, current supply means, and insulation means are disposed between two clamping means.

13. The switching module as defined by claim 1, wherein the insulation means includes a reinforcement means.

14. The switching module as defined by claim 13, wherein the switching means, cooling means, current supply means, and insulation means are disposed between two clamping means.

15. The switching module as defined by claim 1, wherein the switching means, cooling means, current supply means, and insulation means are disposed between two clamping means.

16. The switching module as defined by claim 1, wherein the cooling means is a hollow profile section, in particular of aluminum, for storing and carrying coolant onward within the cooling means.

17. The switching module as defined by claim 1, wherein the switching means are power semiconductors, in particular thyristor cells.

18. A welding control system, having a power section integrated with the welding control system housing, wherein the power section includes a switching module as defined by claim 1.

19. A method for producing a switching module for the power section of a welding control system, having switching means, cooling means of electrically conductive material, and current supply means, the method comprising the steps of:
    disposing the current supply means on the switching means;
    disposing the cooling means for cooling the switching means on the current supply means; and
    placing an insulation means between the cooling means and the current supply means in such a way that the cooling means is electrically insulated from the current supply means.

20. The method as defined by claim 19, wherein a second switching means, a second cooling means, and a second insulation means are provided, and a first terminal of the switching means is disposed on the first current supply means and a second terminal of the switching means is disposed on the second current supply means, so that the two switching means are connected antiparallel, and the switching means are disposed between the two current supply means, and an insulation means is likewise placed on the second current supply means, and a cooling means is disposed on that insulation means as well.

* * * * *